United States Patent [19]  [11] Patent Number: 4,556,958
Ugon  [45] Date of Patent: Dec. 3, 1985

[54] DEVICE FOR SINGLE LINE BIDIRECTIONAL DATA TRANSMISSION BETWEEN AN INTELLIGENT CARD'S MICROPROCESSOR AND A SECOND PROCESSOR

[75] Inventor: Michel Ugon, Maurepas, France

[73] Assignee: Compagnie International pour l'Informatique Cii-Honeywell Bull (Societe Anonyme), Paris, France

[21] Appl. No.: 657,471

[22] Filed: Oct. 4, 1984

Related U.S. Application Data

[63] Continuation of Ser. No. 262,607, May 11, 1981, abandoned.

[30] Foreign Application Priority Data

May 30, 1980 [FR] France ................ 80 12108

[51] Int. Cl.$^4$ ............ G06F 15/16; G06F 3/04; G06F 11/10
[52] U.S. Cl. .................... 364/200; 235/492; 361/401; 340/313; 371/49
[58] Field of Search ... 364/200 MS File, 900 MS File; 235/379–382, 487–488, 492, 494, 382.5; 340/310 R, 313, 321, 825.34; 361/401; 371/49

[56] References Cited

U.S. PATENT DOCUMENTS

| 3,541,523 | 11/1970 | Bidlack et al. | 364/900 |
|---|---|---|---|
| 3,976,840 | 8/1976 | Cleveland | 179/2 DP |
| 4,178,504 | 12/1979 | Farmer | 375/36 |
| 4,201,908 | 5/1980 | Johnson et al. | 235/92 TC |
| 4,204,113 | 5/1980 | Giraud et al. | 235/375 |
| 4,211,919 | 7/1980 | Ugon | 235/487 |
| 4,222,111 | 9/1980 | Sloan et al. | 364/900 |
| 4,272,758 | 6/1981 | Giraud | 340/310 A |
| 4,277,837 | 7/1981 | Stuckert | 364/900 |
| 4,295,041 | 10/1981 | Ugon | 234/487 |
| 4,298,793 | 11/1981 | Melis et al. | 235/487 |
| 4,310,720 | 1/1982 | Check, Jr. | 178/22.08 |
| 4,316,262 | 2/1982 | Mizuta et al. | 364/900 |
| 4,348,740 | 9/1982 | White | 364/900 |
| 4,352,011 | 9/1982 | Guillou | 235/375 |
| 4,380,699 | 4/1983 | Monnier et al. | 235/492 |
| 4,408,119 | 10/1983 | Decavele | 235/382 |
| 4,423,287 | 12/1983 | Zeidler | 178/22.08 |
| 4,453,074 | 6/1984 | Weinstein | 235/380 |
| 4,471,216 | 9/1984 | Herve | 235/380 |
| 4,501,960 | 2/1985 | Jouvet et al. | 235/492 |
| 4,511,796 | 4/1985 | Aigo | 235/492 |

Primary Examiner—James D. Thomas
Assistant Examiner—A. E. Williams, Jr.
Attorney, Agent, or Firm—Kerkam, Stowell, Kondracki & Clarke

[57] ABSTRACT

Each section includes a data processing unit (1) provided with circuitry (7) for transmitting processed data to the other station, as well as circuitry (7) and (2) for reception of the data processed by the other station. The transmission occurs between the stations via only one connection $1_3$, plus a return connection such as $1_1$.

8 Claims, 10 Drawing Figures

DEVICE FOR SINGLE LINE BIDIRECTIONAL DATA TRANSMISSION BETWEEN AN INTELLIGENT CARD'S MICROPROCESSOR AND A SECOND PROCESSOR

This is a continuation of application No. 262,607, filed May 11, 1981 now abandoned.

CROSS-REFERENCE TO RELATED APPLICATION

Devices in accordance with this invention are disclosed in embodiments of a portable machine comprising the subject matter of a commonly-assigned U.S. patent application, Ser. No. 262,606, filed May 11, 1981 now abandoned, by Ugon, et al and entitled "PORTABLE MACHINE FOR CALCULATION OR DATA PROCESSING."

BACKGROUND OF THE INVENTION

The present invention relates to a device for the transmission of signals between two data processing stations.

More particularly, the invention relates to a device for the exchange of data between two microprocessors, at least one of which may be contained within a portable carrier. The connection between the two microprocessors is provided by means of electric contacts when the portable carrier is placed in contact or is coupled with data lines communicating with the device within which the other microprocessor is situated.

Such carriers and associated components are known, as for example are described in commonly-assigned UGON U.S. Pat. No. 4,211,919, issued July 8, 1980, and entitled "PORTABLE DATA CARRIER INCLUDING A MICROPROCESSOR"; and in commonly-assigned U.S. patent application Ser. No. 223,849, filed Jan. 9, 1981, now abandoned, by Michel UGON, and entitled "ONE CHIP MICROPROCESSOR", which is a continuation of Application Ser. No. 030,548, filed Apr. 25, 1978, and now abandoned. The entire disclosures of U.S. Pat. No. 4,211,919 and Application Ser. No. 223,849 are hereby expressly incorporated by reference herein. As described, these carriers may assume the form of a small card of plastics material comprising a self-programmable microprocessor and means for connection to the machine in the form of simple electric contacts.

As a rule, a substantial number of conductors is needed to provide the connections between two microprocessors. Some connections incorporate up to sixteen conductors divided into so-called data and address lines, to which are added additional lines reserved for the transmission of control signals and synchronizing signals, as well as power supply conductors. These connections are unsuitable for devices wherein the connections between the microprocessors are not permanent for the reason that the relatively large number of contacts diminishes the reliability of the systems utilizing devices of this kind.

SUMMARY OF THE INVENTION

Accordingly, an object of the invention is to reduce the risks of faulty operation or of anomalies attributable to bad contacts or to failures of coupling means, by reducing their number to the minimum.

The invention provides a device for the transmission of signals between two data processing stations. Each of the stations includes a data processing means provided with means for transmitting the data processed to the other station, as well as means for receiving data processed by the other station. Each of the stations is arranged to be connected temporarily to the other station via coupling means. In accordance with the invention, data are transmitted between the two stations in both directions along a single electrical (or other, possibly non-electrical) connection. The data are transmitted by the variations of one and only one signal when both stations are coupled by the coupling means. In order to advise the transmitting station that the receiving station is ready to receive data, the single connection for data transmission is connected to a means for detecting a predetermined state of the connection. The device moreover includes a means situated at the transmitter location for transmitting a signal indicating the parity of the message transmitted. This signal is interpreted by the receiving station both as a parity bit and as an end of message signal.

BRIEF DESCRIPTION OF THE DRAWINGS

The invention will now be further described, by way of example, with reference to the accompanying drawings, in which.

DESCRIPTION OF THE PREFERRED EMBODIMENT

Figure 1:
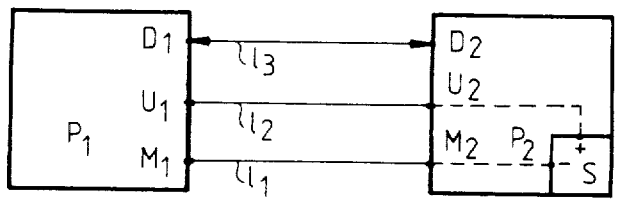
FIG. 1 illustrates the physical connections of the transmitter and receiver in accordance with the invention.

FIG. 1 illustrates the connections utilized to connect the transmitter and receiver in accordance with the present invention. The stations $P_1$ and $P_2$ may each optionally perform the task of the transmitter or that of the receiver. One of these may supply current and voltage required to power the other. This power is supplied on the lines $l_1$ and $l_2$. The line $l_1$ connects the earthing points $M_1$ and $M_2$ of the stations $P_1$ and $P_2$, and at least one of the earthing prints is connected to one of the two output terminals of power supply S present in station $P_2$ in the FIG. 1 embodiment. The line $l_2$ is connected to the other output terminal of the power supply S and thus supplies the other station, $P_1$ in FIG. 1, to the other terminal of the power supply S.

The line $l_3$ transmits the data or items of information between the two stations $P_1$ and $P_2$. These data are transmitted in a binary pattern, in the form of a series of logic "0" or "1" states, and are represented by variations of the current flowing in the line $l_3$ or by variations of the electrical potential of the conductor $l_3$ or by variations of the electrical potential of the conductor $l_3$ with respect to the conductors $l_2$ or $l_1$. It will be appreciated the invention is not limited as to the kinds of electrical transmission, as other methods of transmission can be envisaged. In the case of optical transmission, use may be made of a connection by means of optical fibers. In the case of radio transmission, a waveguide, aerials or capacitive linkages can be employed.

Figure 2:
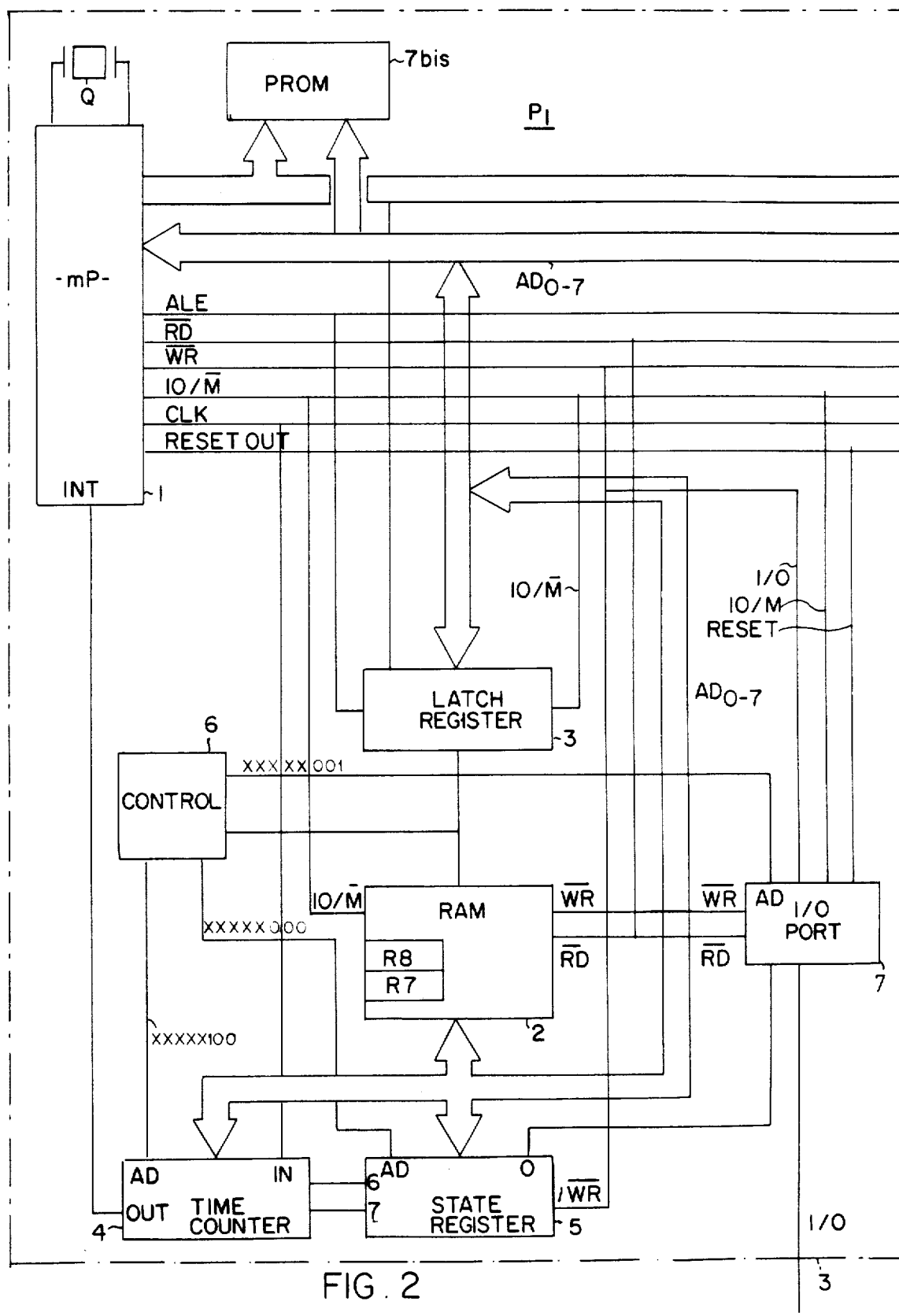
FIG. 2 illustrates a transmitter or receiver element utilized in an exemplary embodiment of the present invention.

FIG. 2 illustrates the transmission and reception device utilized in each of the two stations $P_1$ and $P_2$. In the case of FIG. 2, it is assumed that the station illustrated is the station $P_1$. This station comprises at least one microprocessor 1, associated with elements for controlling the input and output of the data entering or leaving the station. These elements include a storage device 2 in the form of a Random Access Memory (RAM), a lock or latch register 3, a time counter 4, a state register 5, a control circuit 6, a Programmable Read Only Memory (PROM) 7', and a bidirectional transceiver or port circuit 7 connected to the data line $l_3$ for transmission and reception of data. The control circuit 6 is described in detail hereinbelow with reference to FIG. 5, and the port circuit 7 is described in detail hereinbelow with reference to FIG. 4. The microprocessor 1 may be a microprocessor Type No. 8080 or 8085 sold by the INTEL Corporation, and others. This microprocessor 1 may be connected to elements other than those illustrated in FIG. 4, via its address lines $A_{8-15}$ and data lines $AD_{0-7}$.

The eight data lines $AD_{0-7}$ are connected to the input terminal of the latch register 3 for addressing the random access memory RAM 2.

This memory RAM 2 for example has a capacity of 2K bits organized into 256×8 bits. It contains a register R7 to record the octet transferred via the port 7, and a register R8 for recording the parity bit corresponding to the octet transferred.

By the state of its outputs, the latch register 3 also selects the control circuit 6.

The control circuit 6 selects the port circuit 7 for transmission and reception of data when the binary pattern stored in the latch register 3 is XXXXX001. It selects the state register 5 when the binary pattern in the register 3 is XXXXX000. Finally, it selects the time counter 4 when the binary pattern in the register 3 is XXXXX100.

The time counter 4 has its inputs connected in parallel to the data lines $AD_{0-7}$ in such manner that it may be loaded at any instant with an initial time value by the microprocessor 1.

The state register 5 is also connected to the lines $AD_{0-7}$ in order to enable the same to store an instruction issued by the microprocessor 1. This is a register comprising eight flip-flops whose states enable the selection of either the input/output port circuit 7 or the time counter 4.

The line ALE connects the microprocessor 1 to the latch register 3 and carries the blocking signal to latch register 3 so as to give or refuse authorization to address the memory RAM 2 and the control element 6.

A line $I0/\overline{M}$ selects either the memory RAM 2 or the inpu-output circuit 7. The lines $\overline{RD}$ and $\overline{WR}$ control the read-write operations and are connected to the appropriate control circuits of the memory RAM 2 and of the port circuit 7.

The microprocessor 1 is synchronized by a clock Q comprising a quartz crystal. It transmits clock signals on the line CLK to the input IN of the time counter 4. The RESET OUT line is connected to the input of the port circuit 7 and enables initialization of the system into the input-output mode.

The microprocessor 1 is also connected via its data and address lines to the read-only memory 7' in which are entered the microprograms needed for transmission and reception of data by the removable carrier M3 or the machine.

The processing element of the machine and processing element of the removable carrier M3 each comprise a set of devices such as are described above with reference to FIG. 4.

Figure 3:
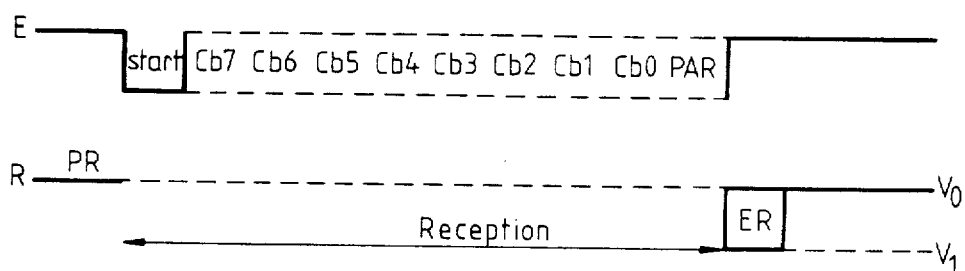
FIG. 3 is a timing diagram corresponding to the transmission of a message comprising one octet, i.e., 8-bit word, in accordance with the invention.

FIG. 3 illustrates the chronological sequence of a message transmitted on the data line $l_3$ in bit serial form. The transmission of a message comprising an octet (eight bits) occurs over ten intervals. The first interval is utilized to transmit the message START signal (START bit). The second through ninth intervals are utilized for transmission of the message as such (Cb7 through Cb0). The parity bit (PAR) is transmitted during the tenth interval.

The receiver receives the signals transmitted during these ten intervals and performs a parity check during an eleventh. The receiver signals the transmitter that it is ready to receive a message by placing the data line $l_3$ at a potential $V_0$ (signal PR). This signal PR occurs at least one interval prior to the transmission of the START bit. After reception and verification, if the parity check carried out on the message discloses that there was an error, the receiver places the line $l_3$ at a potential $V_1$. If there is no parity error, indicating correct transmission and reception, the line $l_3$ is returned to the initial potential $V_0$.

The eight bits comprising an octet are transferred in sequence on the conductor $l_3$ and are stored successively in the register R7 of the memory RAM 2.

This transfer is performed by successive reading of the port 7, successive transfer into the accumulator register of the receiving microprocessor, and transfer following alignment of the accumulator register into the register R7 of the memory RAM 2. Upon transfer of each new bit, a parity bit is calculated whilst making allowance for the parity of the bits already received. The result of the parity calculation is transferred into the register R8 of the memory RAM 2. The end of message bit which also acts as a parity bit for the message transmitted is compared with the parity bit calculated and stored in the register R8. The transmission is accepted as correct if the two bits are of equal value. If they are not, this anomaly is reported to the transmitter by transmission of the signal ER from the receiver.

Figure 4:
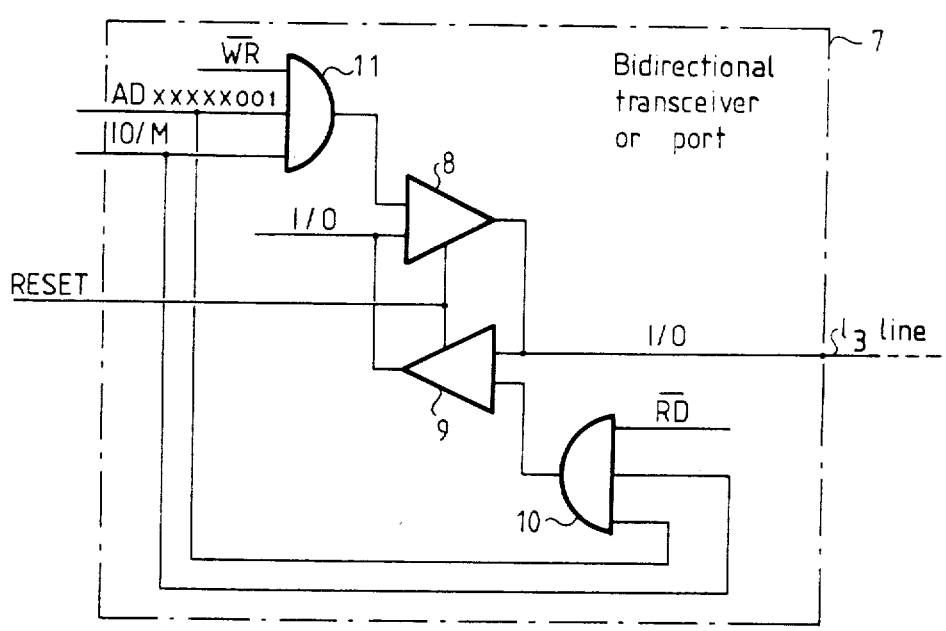
FIG. 4 shows a bidirectional transceiver circuit employed as a port for transmission and reception of messages in accordance with the invention.

FIG. 4 shows in detail the bidirectional transceiver or port circuit 7 of FIG. 2. This transceiver circuit 7 comprises tri-state output amplifiers 8 and 9 controlled by respective control gates 10 and 11. The output of the amplifier 8 is connected to the input of the amplifier 9. These two amplifiers 8 and 9 are connected to the line $l_3$ in such manner that the amplifier 8 may be utilized to transmit data (I/O) on the line $l_3$ and the amplifier 9 to receive the data (I/O) from on the line $l_3$.

The gate 11 controls the amplifier 8 when it is selected both by the pattern XXXXX001 received from the control circuit 6, by the line IO/$\overline{\text{M}}$, and by a write instruction WR transmitted by the microprocessor 1. Similarly, the gate 10 controls the amplifier 9 when it is selected by the pattern XXXXX001, by the line IO/$\overline{\text{M}}$, and by a read instruction transmitted by the microprocessor 1. The amplifiers 8 and 9 are initialized by means of the RESET signal.

Figure 5:
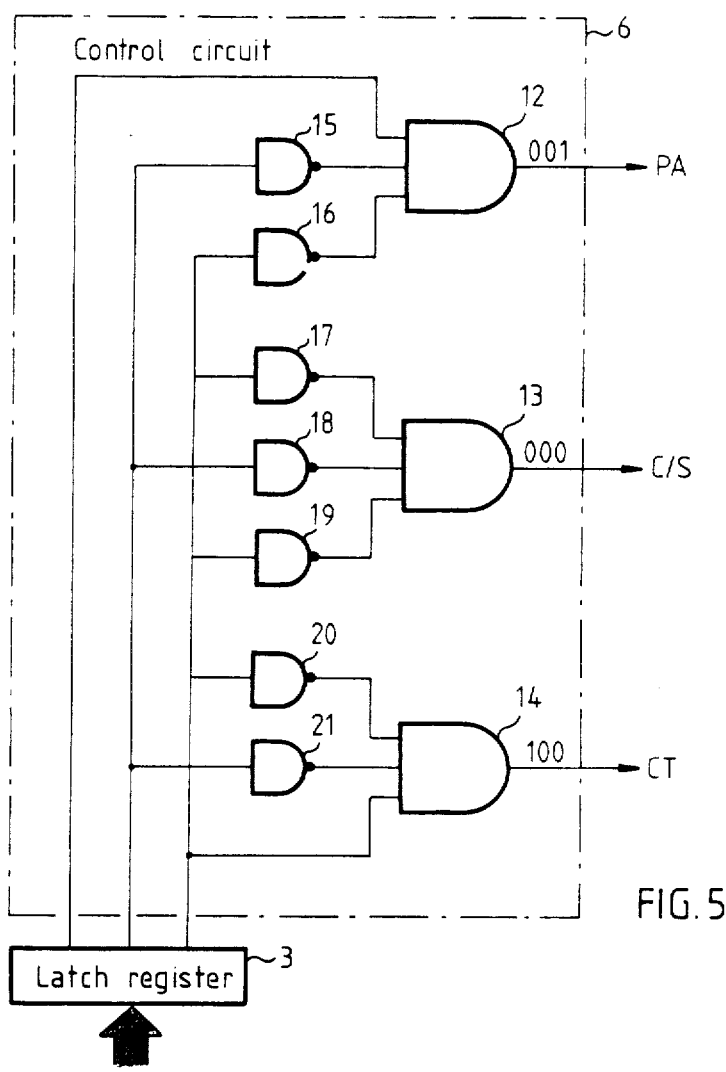
FIG. 5 is an illustration of the control circuits of FIG. 2.

The FIG. 2 control circuit 6 is illustrated in detail in FIG. 5. This circuit is for decoding data contained in the FIG. 2 latch register 3. AND gate 12 and inverters 15 and 16 decode the address signal XXXXX001 to select the transceiver circuit 7. AND gate 13 and inverters 17, 18 and 19 decode the address signal XXXXX000 to select the state register 5. AND gate 14 and inverters 20 and 21 decode the address signal XXXXX10 to select the time counter 4.

Figure 6:
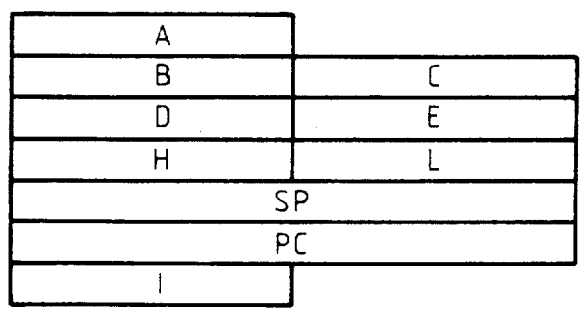
FIG. 6 is an illustration of the working registers of an 8080 microprocessor CPU, such as for example sold by the INTEL Corporation, which may be employed in embodiments of the transmitters and receivers of the invention.

FIG. 6 provides an illustration of the working registers contained in a microprocessor CPU of the 8080 or 8085 type.

Register A is the accumulator. Registers B, C, D, E are working registers and are adapted to receive data. Registers H and L are address registers. Register SP (Stack Pointer) contains the address of a cell register and is utilized during interrupt to point to the address of a memory location to save the contents of particular registers of the microprocessor or to resume interrupted processing operations. Register PC is the Program Counter and allows the passing to the next instruction during execution of a program. The register I is an Index register which enables data addressing by indexing.

The details relating to the functionality of these registers are given in the book entitled "Les microprocesseurs" by Pierre Le Beaux and Rodnay Zaak, published by the publishing company Sybex—313 rue Lecourbe 75015 PARIS—C 1977.

Figure 7:
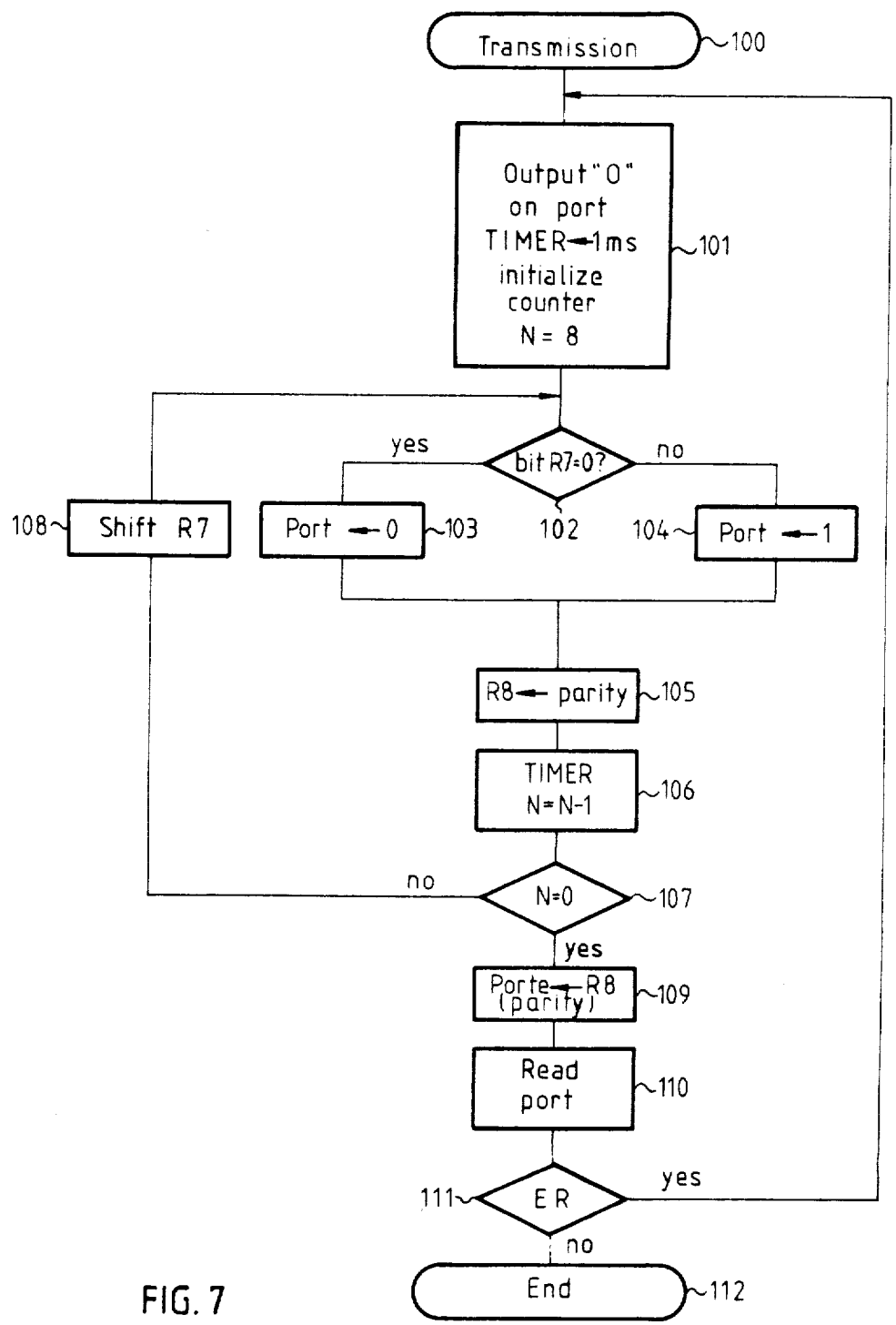
FIG. 7 is an exemplary flowchart depicting a suitable microprogram for data transmission on the transmission line.

The flowchart of FIG. 7 illustrates the different steps necessary to execute the microprogram for a transmitting microprocessor, beginning at Step 100.

During Step 101, the transmitting microprocessor sets the connecting line $l_3$ to the logic state "0" and loads the time counter 4 with the bit time (1 ms) required for bit serial transmission of the START bit and the following octet in the manner illustrated in FIG. 5, and initializes N=8 for the eight bits of the octet.

The end of the START bit occurs when the time counter 4 interrupts the microprocessor 1. At step 102, the octet which is to be transferred, contained in the register R7 of the memory RAM 2, is loaded into the accumulator register A of the microprocessor 1 to test the value of the first bit.

Depending on this value, either Step 103 or Step 104 is entered to transmit the corresponding value of the first bit read in the register R7 on the conductor $l_3$.

During Step 105, the parity bit corresponding to the message which is to be transmitted is calculated and transmitted into a bit position of the register R8 of the memory RAM 2.

In Step 106, N is decremented. If N is not yet zero, the program loops back, through Step 108.

During Step 108, the content of the register R7 is shifted to the left by one binary position.

This process repeats at each interrupt caused by the time counter 4, and is completed when all the bits of the octet have been delivered successively.

Step 107 checks that all bits have been transferred.

During Step 109, the parity bit stored in the register R8 is transferred in its turn. The receiver may then calculate the parity of the bits of the octet received, and compare the calculated parity bit with the received parity bit.

The transmission cycle is completed in case of coincidence (Step 112). In the absence of coincidence, the receiver signals the presence of an error to the transmitter (signal ER, FIG. 5) and another transmission cycle is performed starting at Step 101.

Figure 8:
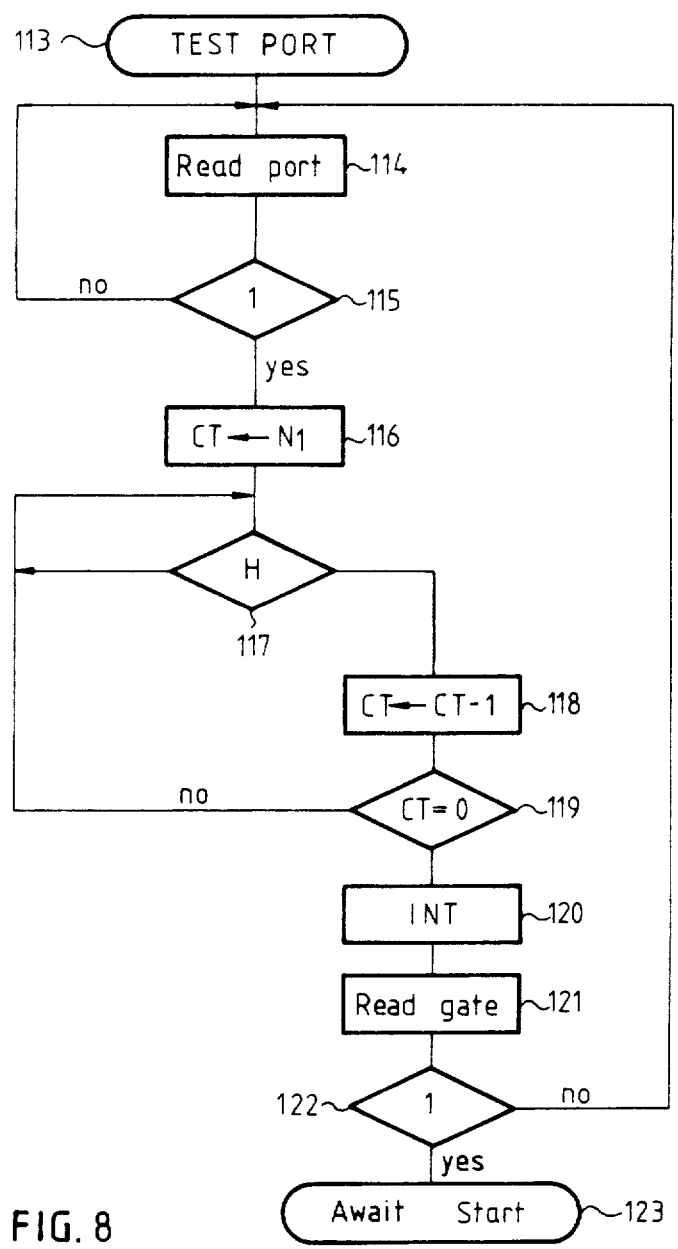
FIG. 8 is an exemplary flowchart depicting a suitable microprogram for the logic state of the transmission line between two transmissions.

FIG. 8 is a program flowchart beginning at Step 113 showing the operations performed by the receiver when it is on standby (ready), waiting for a message coming from the transmitter. These tests are performed by repeated read operations of the logic state of the transmission line $l_3$.

During Step 114, the port 7 is read repeatedly in a loop while the logic state of line $l_3$ is at "0".

When the state of the line changes to logic "1" (Step 115), the time counter 4 is loaded to a predetermined time value (Step 116), in such manner as to cause a microprocessor interrupt and to cause the logic state of the port 7 to be read when this time value is exhausted.

This test occurs during Step 122. If, during this step, the logic state of the port 7 is "1", the receiver is placed in readiness for the START signal. If, on the contrary, the logic state of the port 7 is "0", it is inferred that the test performed during Step 115 had taken place on noise or other interference, and the receiver is then returned to Step 114.

Figure 9:
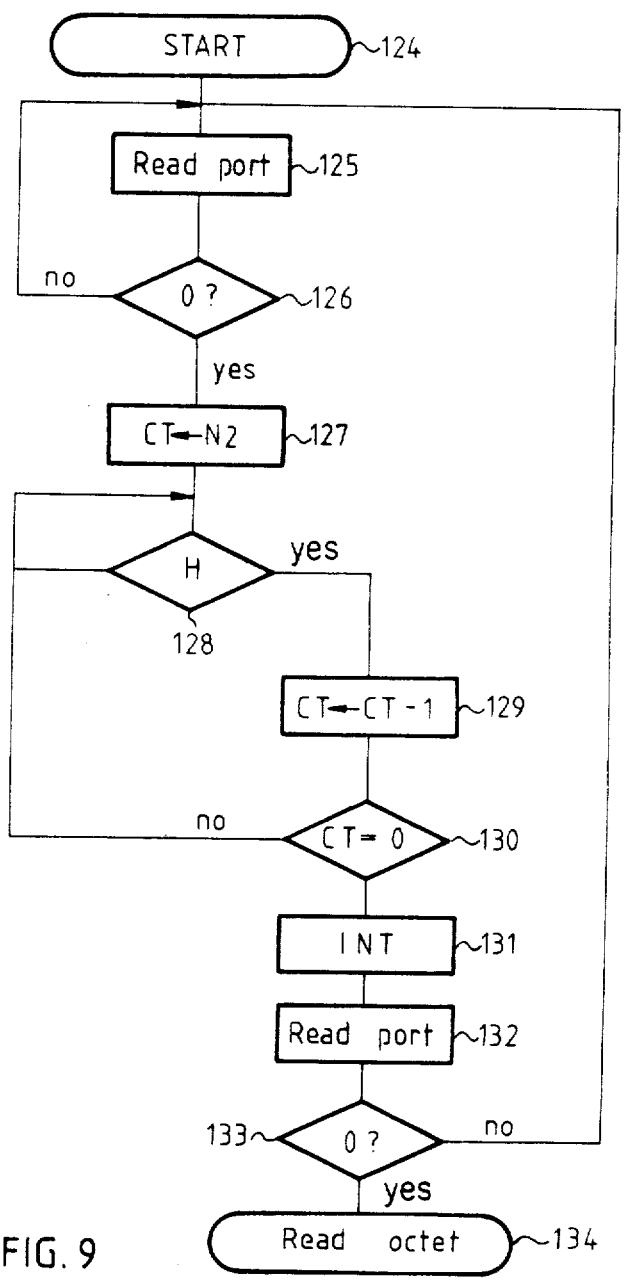
FIGS. 9 and 10 are exemplary flowcharts depicting to the data read microprograms transmitted by the transmitter and received by the receiver.

FIG. 9 is a program flowchart showing the sequence for reception of the START signal or bit, beginning with step 124.

During Step 125, the receiver reads the logic state of the port 7.

At Step 127, the time counter 4 is loaded to a predetermined time value $N_2$ as soon as the conductor $l_3$ assumes the logic state "0", as tested in Step 126.

This time value is decremented during Step 129 at the rate of the internal clock of the microprocessor until it reaches zero (Step 130).

The time counter 4 reaching zero causes an interrupt of the microprocessor, which then performs a read operation on the port 7 (Step 132).

If the conductor $l_3$ still has the logic state "0", there is confirmation that the signal in question is an actual START signal, and not a noise or interference signal. The octet reading operation of FIG. 12 (beginning at Step 134) may then be performed.

Figure 10:
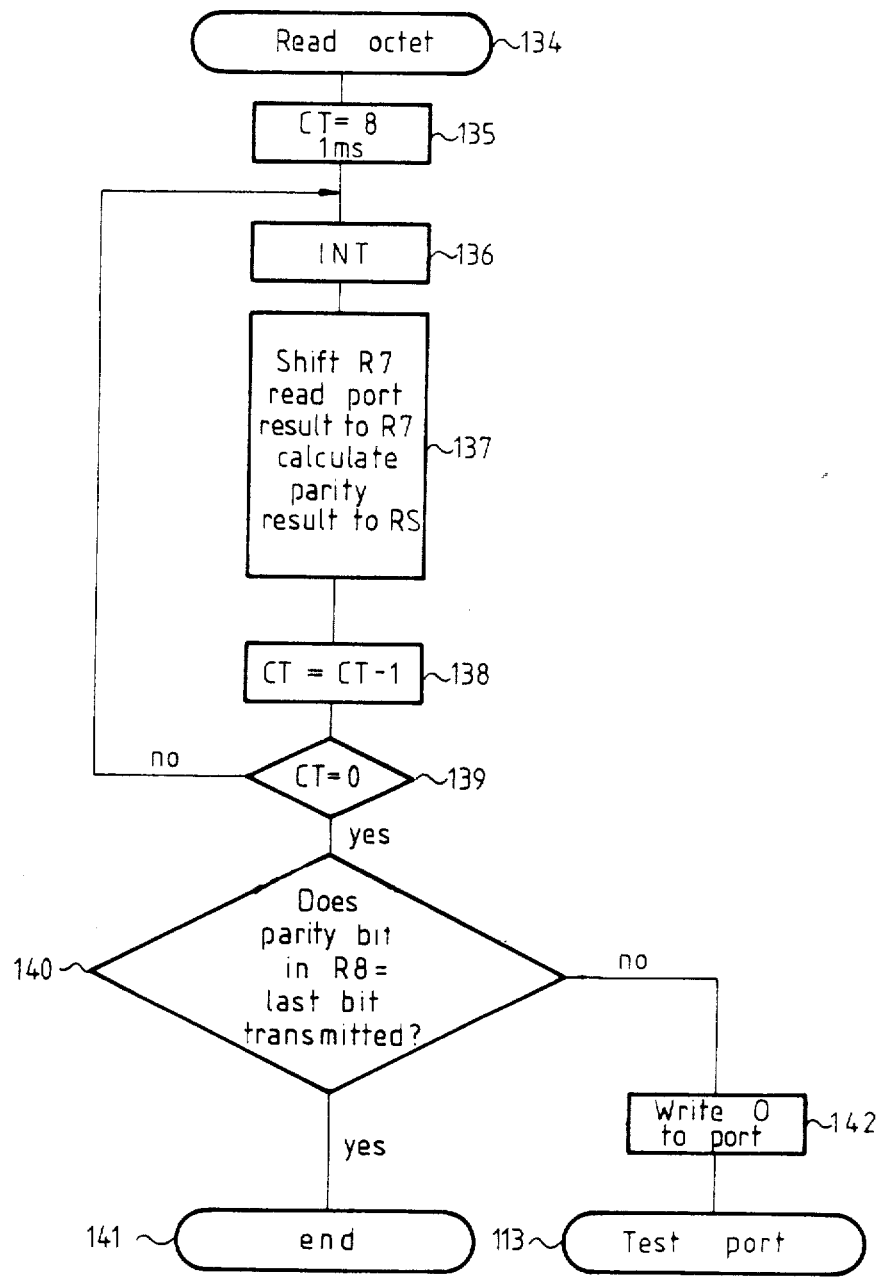

FIG. 10 is a flowchart showing the octet read sequence, beginning with Step 134.

In Step 135, the time counter 4 is loaded to a time value corresponding to the period needed to read the eight bits transmitted. For example if the period of each bit is 1 ms, the value of the transmission time loaded into the time counter 4 is 8 ms.

Each transfer of a bit causes an interruption of the receiving microprocessor (Step 136) to authorize the latter, in Step 137, to store the bit read on port 7 in the register R7, to perform a parity calculation on the bits already received with regard with that just received, and to load the parity calculation result into the register R8.

When an octet has been transferred into the register R7, the time counter 4 reaches the zero state simultaneously with reception of the parity bit transmitted by the transmitter.

In Step 140, a comparison is then made between the bit transferred by the transmitter and the bit previously calculated and stored in the register R8 of the receiver. If there is correspondence between the two parity bits, the transmission has occurred without error and is considered as being completed (Step 141). If, on the contrary, the two parity bits are different, there is a transmission error, and this error is reported to the transmitter at Step 142 by writing a logic state "0" on the port connected to the line $l_3$. The sequence for testing the state of the port 7 is then resumed (Step 113).

The system for scrutinizing the logic state of the line $l_3$ and for supplying signals makes it possible to synchronize the dispatch of the messages upon transmission with the operation of the receiving station. A dual level of asynchronism is thus accomplished which is independent of the functions processed at the level of each station since, apart from the interrupt periods, the stations lend themselves to performing other tasks wholly independent of each other, and independent of the programs of the receiver, since the interrupt may be initiated at any instant.

The program sequences which have been described with reference to the flowcharts of FIGS. 7, 8, 9 and 10 may be performed by means of the following specific exemplary instructions stored in the FIG. 2 PROM memory. The instruction set is that of the INTEL 8080 CPU.

| Instructions | Remarks |
|---|---|
| TRANSMISSION | |
| 100 OUT PA | Port A ← 0 |
| 101 LHLD | |
| 102 MOV A,M | (initialization of the time counter) |
| 103 MOV CT, A | CT ← A |
| 104 LHLD | |
| 105 MOV B,M | B ← 0 |
| INT | (time counter interruption) |
| 106 LDA | A ← 8 |
| 107 SBB B | |
| 108 JZ NEXT (113) | |
| 109 LDA | A ← R7 |
| 10A OUT Port A | |
| 10B MOV C,A | C ← A |
| 10C ANA | mask 1 000 000 |
| 10D XRA,M | parity calculation A $A_0 \leftarrow R8 + A_0$ |
| 10E LHLD | |
| 10F MOV M,A | parity in R8 |
| 110 MOV A,C | A ← R7 |
| 111 RLC | shift R7 |
| 112 MOV M,A | R7 ← A |
| 113 LDA | A ← R8 |
| 114 OUT Port A | |
| 115 NOP | |
| 116 IN Port A | |
| 117 CPI | if 1 = error |
| 118 JNC NEXT (100) | |
| 119 RET | End |
| TEST PORT | |
| 11A IN Port A | $A_0$ ← state of Port 7 |
| 11B CMP M | Compare $A_0$ to 1 and make S = 1 in PSW if ≠ |
| 11C RM NEXT = (11A) | If S = 1 return to 11A |
| 11D LHLD | load H,L with memory contents present at address gg and PP. A ← N |
| 11E MOV CT,A | CT ← N |
| 11F RET | |
| START | |
| 121 IN Port A | |
| 122 CMP M | Make S ← 1 in PSW if ≠ |
| 123 RM NEXT (121) | Return to 121 if S = 1 |
| 124 LHLD | |

-continued

| Instructions | Remarks |
|---|---|
| 125 MOV A,M | |
| 126 MOV CT,A | |
| 127 RET | |
| INT. START | |
| 128 PUSH PSW | Save A and PSW |
| 129 IN Port A | |
| 12A CMP M | Make Z = 0 of PSW if gate = 0 |
| 12B RM NEXT (128) | If Z = 1, return to 128 |
| 12C CNZ Read Octet | |
| READ OCTET | |
| 12D LHLD | |
| 12E MOV A,M | |
| 12F MOV CT,A | |
| 130 LXI B | B ← 0 |
| 131 RET | |
| INT | |
| 132 LHLD | |
| 133 MOV A,M | |
| 134 RLC | |
| 135 MOV D,A | |
| 136 IN Port A | |
| 137 MOV E,A | |
| 138 LHLD | Addressing of R8 |
| 139 XRA | Parity in A |
| 13A MOV M,A | Parity in R8 |
| 13B MOV AE | |
| 13C ORA D | |
| 13D LHLD | Addressing of R7 |
| 13E MOV M,A | R7 ← A |
| 13F INX B | |
| 140 LDA | A ← 8 |
| 141 SBB B | |
| 142 JP | Z ← 1 of PSW upon = 0 |
| 143 RET | |
| 144 MOV A,E | |
| 145 LHLD | Addressing of R8 |
| 146 CMP M | |
| 147 JZ NEXT (149) | Make Z = 1 of PSW if equality |
| 148 End | |
| 149 OUT Port A | |
| 150 CALL Port Test | |

The example which has been given of a preferred embodiment of the invention is in no way restrictive, and it is obvious that any one versed in the art who is well acquainted with the techniques of data transmission systems will be able to envisage other embodiments of the invention without thereby exceeding its scope.

What is claimed is:

1. A signal transmission device comprising first and second data processing stations, at least one of the stations being incorporated in a portable object, said portable object comprising a small plastic card embodying a microprocessor, each station having transmission means for transmitting, when in a transmission mode, a signal to the other station and having receiving means for receiving, when in a reception mode, a message transmitted from the other station; and means for coupling the stations together, the coupling means providing a single bidirectional signal line over which a message is transmitted in bit serial form by variations of a signal on the line; each station including first means for placing the line in a first predetermined state when such station is in the reception mode to advise the other station that it is ready to receive a message; second means, operative when the station is in the transmission mode, for detecting said predetermined state; third means controlled by said second means for generating and transmitting a start bit signal to the other station, the start bit signal preceeding a first bit of the message; fourth means operative when the station is in the transmission mode for calculating from the transmitted message a first parity bit and for transmitting the first parity bit to the other station; fifth means operative when the station is in the receiption mode for calculating a second parity bit from the received message and for comparing the first and second parity bits; and sixth means controlled by said fifth means for placing the line in a second predetermined state different from the first predetermined state upon a difference between said first and second parity bits being detected to advise the other station of a transmission error.

2. A device according to claim 1, wherein each station includes data processing means, and said data processing stations each comprise at least one microprocessor.

3. A device for transmission of signals between two data processing stations according to claim 1, wherein the transmission means of each station has means for resynchronizing the operation of the station in the transmission mode with the operation of the receiving means of the other station in the reception mode when the other station has completed a task, such that transmission is wholly independent of other functions implemented in the stations.

4. A device for transmission of signals between two data processing stations according to claim 1, wherein said single bidirectional signal line comprises a first signal conductor, and a second conductor providing a return connection between two stations via said coupling means.

5. A device according to claim 1, wherein said single bidirectional signal line is an optical line.

6. A device according to claim 2, wherein the transmitting means and the receiving means comprises first and second tri-state amplifiers, one being connected to receive signals from the line and other being connected to output signals to the line, and first and second control gates for respectively controlling the first and second tri-state amplifiers.

7. A device according to claim 6, wherein the control gates are controlled by logic signals from the data processing station in accordance with the operating mode of the station.

8. A device according to claim 6, wherein said first and second predetermined states comprise first and second voltages, and wherein said message is transmitted by variations in a third voltage.

* * * * *